Patented June 19, 1945

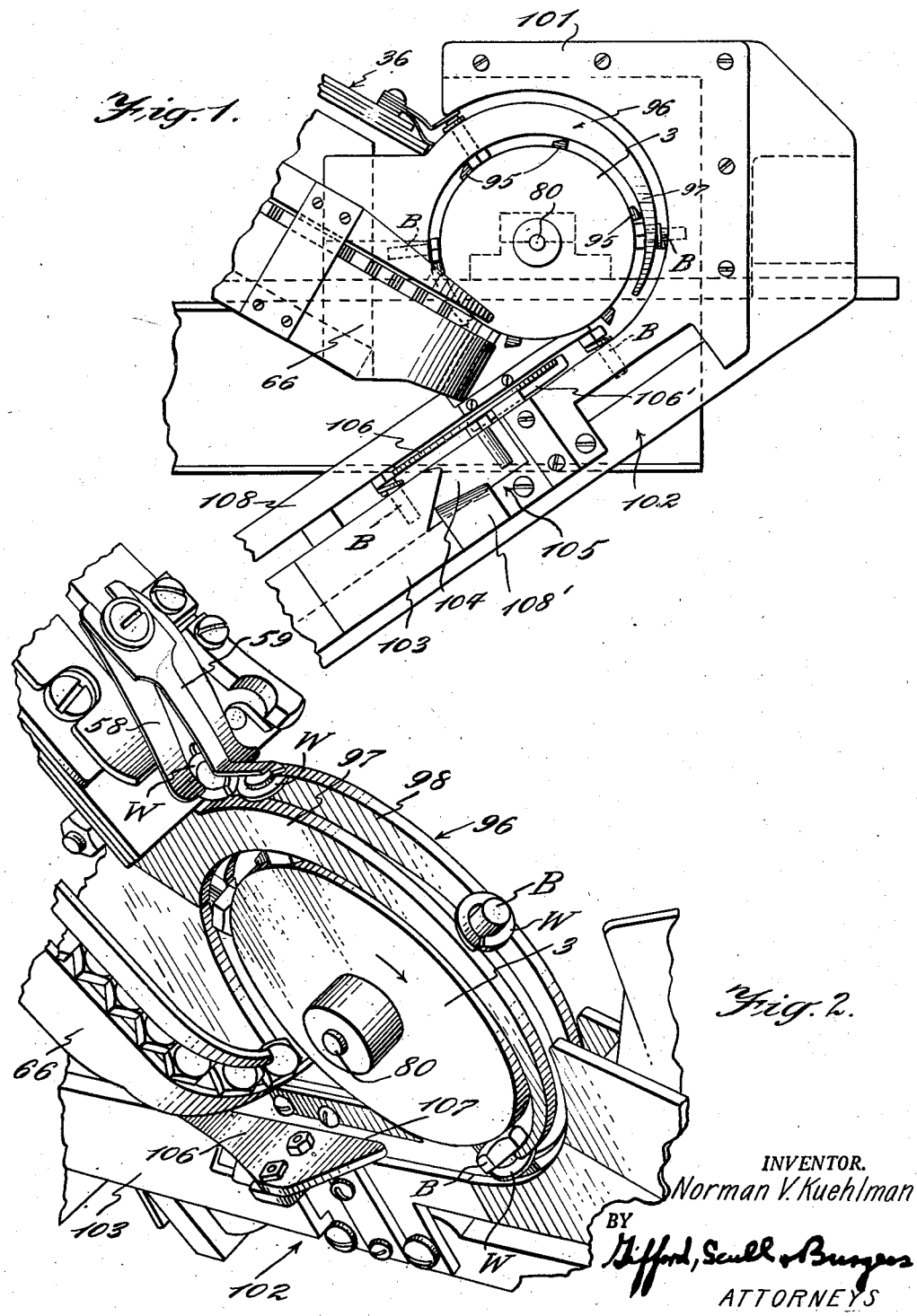

2,378,711

UNITED STATES PATENT OFFICE 2,378,711

ASSEMBLY TRACK AND ASSORTER

Norman V. Kuehlman, Milwaukee, Wis., assignor to The National Lock Washer Company, Newark, N. J., a corporation of New Jersey Original application July 10, 1941, Serial No. 401,804. Divided and this application August 25, 1942, Serial No. 456,042

2 Claims. (Cl. 209—82)

This is a division of my application Ser. No. 401,804. The invention described and claimed herein is for a bolt blank and washer assembly track and assorter adapted to convey the assembled bolt blank and washer away from an assembly mechanism and reject misaligned or improperly proportioned or sized assemblies before delivering them to a suitable storage space.

Fig. 1 is a side elevation of an assembly mechanism and a track for conveying the assembled blank and washer away from said mechanism.

Fig. 2 is a perspective view of an assembly mechanism and the track for conveying the assembled devices away from said mechanism.

The assembly mechanism shown in the drawing is described in detail in my application referred to above. It consists of a wheel 3 mounted on a suitable axle 80 by which it is designed to be rotated. Wheel 3 has projecting from it a plurality of lugs 95.

Cooperating with wheel 3 and surrounding a great part of the periphery thereof is a double track 96 made up of parallel flat plates 97 and 98. These are spaced apart a little more than the thickness of the shank of a bolt blank. An outside assembly track 101 surrounds the arcuate track 96 and is also made up of a pair of parallel flat plates spaced apart sufficiently to accommodate the shank of a bolt blank therebetween. The bolt blanks flow by gravity along track 66 to the assembly device. They are picked up by lugs 95 on revolving wheel 3 as it moves in a counter-clockwise direction, as seen in the figures, and the space between the revolving wheel 3 and the arcuate tracks 96 is just sufficient to accommodate the head of the bolt blank, with the result that the blank projects in a radial direction from the assembly wheel.

The washer track is shown at 36. The washers are moved down along this track under the spring 58 and as the end of a bolt blank B comes up under a washer it will enter the same and carry the latter around on the blank. This action is facilitated by the pressure of the spring 59. As the blank moves around, the washer is between the arcuate track 96 and the outer tracks 101 and, because of the arcuate shape, the washer is gradually forced down towards the head of a blank and when the assembly is discharged from the assembly wheel it moves onto suitable tracks 103 and 104.

The present invention will operate in conjunction with many other forms of assembly mechanism and is not limited to the construction shown and described herein.

As the assembly blanks and washer leave the assembly wheel, they fall onto a discharge track 102 formed as a continuation of the tracks around which the blank and the washer are moved by wheel 3. Track 102 is made up of a pair of rails 103, 104. As an assembly A, made up of a blank and washer, travels downwardly by gravity along track 102 between the rails 103 and 104, it reaches a gap 105 in the rail 103 (Fig. 1). Opposite the gap 105 is a plate 106 disposed at right angles to tracks 103 and 104 and with an edge 107 which is arranged parallel to track 104 and so spaced therefrom as to engage the side of the head of a blank B upon which a lock washer has been properly assembled as said blank and lock washer slide along track 104. Plate 106 is raised far enough above the top of track 104 so that, if a blank without any washer passes down along the discharge track 102 it will pass under the edge 107 of the plate 106 and, when it reaches the gap 105, such blank will have no support on one side thereof and will fall out through the gap 105 to be discarded. If, on the other hand, a blank has a washer underneath the head thereof, the head will be raised sufficiently so that plate 106 will engage the side of the head and, in cooperation with track 104, will support the assembly until it has passed beyond the gap 105.

In order to facilitate the discharge of blanks having no washers thereon through gap 105, a flat spring 106' aids in pushing the assemblies or bolt blanks out through gap 105. A curved plate 108' offers a slanting surface to a blank without a washer as it drops from the discharge track, to facilitate the disposal thereof through gap 105. A top rail 108 holds and guides the assemblies as they slide down the discharge track to whatever receptacle is designed to receive it.

While I have shown the invention as embodied in a specific form, it is to be understood that various changes in details may be made without departing from the scope of the invention as defined by the appended claims.

I claim:

1. In a device of the character described, an inclined track having a pair of spaced rails arranged to support on the tops thereof a washer and blank assembly, with the washer and head of the blank above the rails, and the shank of the blank between the rails, one of said rails having a gap therein through which the shank of a blank may pass, spring means opposite the said gap and adapted to engage the blank head of an assembly passing along said track, and a member positioned above said gap and having a surface extending parallel with the path of travel of an assembly along the top of said rails and spaced therefrom a distance more than the thickness of the head of a blank and adapted to engage the side of the head of a blank which has a washer thereunder so as to support said assembly as it moves past said gap along said rails and to permit a blank which has no washer thereon to be forced out through said gap by said spring.

2. In a device of the character described, a track having a pair of spaced rails arranged to support on the tops thereof a washer and blank assembly, with the shank of the blank between the rails, said rails being inclined to the vertical and the lowermost rail having a gap therein through which the shank of the blank may pass, a member having a surface extending parallel with said lowermost rail and across said gap and positioned above the top of said lowermost rail so as to engage the side of the head of the blank of an assembly, but high enough above said rail to permit the head of a blank which has no washer thereon to pass thereunder and through said gap, and a flat spring positioned opposite the said gap and adapted to produce lateral pressure on a blank or an assembly as they pass said gap and to force the former through said gap.

NORMAN V. KUEHLMAN.